(12) United States Patent
Trezieres (10) Patent No.: US 12,392,306 B2
(45) Date of Patent: Aug. 19, 2025

(54) LOCK SYSTEM FOR A THRUST REVERSER

(71) Applicant: Goodrich Actuation Systems SAS, Saint-Marcel (FR)

(72) Inventor: Marlene Marcelle Simone Trezieres, Cornebarrieu (FR)

(73) Assignee: GOODRICH ACTUATION SYSTEMS SAS, Saint Ouen L'Aumone (FR)

( * ) Notice: Subject to any disclaimer, the term of this patent is extended or adjusted under 35 U.S.C. 154(b) by 0 days.

(21) Appl. No.: 18/158,093

(22) Filed: Jan. 23, 2023

(65) Prior Publication Data

US 2023/0313756 A1 Oct. 5, 2023

(30) Foreign Application Priority Data

Mar. 31, 2022 (EP) ...................................... 22305425

(51) Int. Cl.
*F02K 1/76* (2006.01)

(52) U.S. Cl.
CPC .......... *F02K 1/766* (2013.01); *F05D 2270/62* (2013.01)

(58) Field of Classification Search
CPC ...................................................... F02K 1/766
See application file for complete search history.

(56) References Cited

U.S. PATENT DOCUMENTS

| | | | |
|---|---|---|---|
| 3,376,441 A * | 4/1968 | Martin ................. | H02K 41/025 310/13 |
| 6,021,636 A | 2/2000 | Johnson et al. | |
| 7,007,454 B2 | 3/2006 | Dehu et al. | |
| 8,739,586 B2 * | 6/2014 | Yuan ..................... | E05B 15/04 292/144 |
| 9,482,180 B2 | 11/2016 | Bol | |
| 10,174,717 B2 | 1/2019 | Wharton et al. | |
| 2003/0042358 A1 | 3/2003 | Sternberger | |
| 2004/0231317 A1 | 11/2004 | Dehu et al. | |
| 2008/0111430 A1 * | 5/2008 | Jenny ................... | H02K 41/031 310/12.25 |
| 2009/0283634 A1 * | 11/2009 | Tran ..................... | E05B 47/023 244/102 A |
| 2018/0226872 A1 * | 8/2018 | Barthel ................ | H02K 41/031 |
| 2018/0334995 A1 | 11/2018 | Hawksworth et al. | |
| 2023/0228230 A1 * | 7/2023 | Alstad ................... | F02K 1/72 60/226.2 |

OTHER PUBLICATIONS

European Search Report for Application No. 22305425.5, mailed Sep. 19, 2022, 7 pages.

* cited by examiner

*Primary Examiner* — Ted Kim
(74) *Attorney, Agent, or Firm* — CANTOR COLBURN LLP (57) ABSTRACT

A lock system for an aircraft thrust reverser includes a lock member translatable between a locked position, in which the lock member is extended for preventing deployment of the thrust reverser by the lock member blocking the path of a movable component of the thrust reverser, and an unlocked position, in which the lock member is retracted for permitting deployment of the thrust reverser by the lock member moving out of the path of the movable component. The lock system also includes a linear electric motor or a solenoid for translating the lock member between the locked position and the unlocked position.

11 Claims, 3 Drawing Sheets

LOCK SYSTEM FOR A THRUST REVERSER

CROSS-REFERENCE TO RELATED APPLICATIONS

This application claims priority to European Patent Application No. 22305425.5 filed Mar. 31, 2022, the entire contents of which is incorporated herein by reference.

FIELD

The present disclosure relates generally to a lock system and in particular to tertiary lock systems for thrust reverser components used in an aircraft (e.g. translating thrust reverser cowls).

BACKGROUND

Thrust reversers are provided on jet engines typically to increase the amount of braking on an aircraft upon landing. When deployed, a thrust reverser changes the direction of thrust of the jet engine such that some or all of the thrust is directed forwards, which acts to slow the aircraft, e.g. so that it can then taxi off the runway.

There are a number of types of thrust reverser, all of which must be stowed during normal aircraft operation, for example so that the thrust reverser cannot be deployed during take-off or at a cruise altitude and can only be deployed during landing. In order to enable this, one or more lock members are provided to prevent unwanted deployment of the thrust reverser, and in particular the actuators that move the various parts of the thrust reverser assembly.

Most thrust reverser systems include three lines of defence against unwanted deployment. Although this may depend on the particular configuration, two locks are typically coupled to the actuators of the thrust reverser, called "primary" locks, and the third lock (a "tertiary" lock) may be coupled to a thrust reverser component (e.g. a translating cowl).

Conventionally, tertiary lock systems are hydraulically actuated via a piston or include a hook style locking member. Hydraulically actuated systems are often heavy and include a complex system of pipes to supply the hydraulic fluid. Hook style systems, electrically or hydraulically actuated, are more challenging to integrate and often provide a weaker load path.

It is desired to provide an improved tertiary lock system that is lightweight, compact and robust.

SUMMARY

In accordance with an aspect of the disclosure, there is provided a lock system (e.g. a tertiary lock system) for an aircraft thrust reverser, comprising of a lock member translatable between a locked position, in which the lock member is extended for preventing deployment of the thrust reverser by the lock member blocking the path of a movable component of the thrust reverser, and an unlocked position, in which the lock member is retracted for permitting deployment of the thrust reverser by the lock member moving out of the path of the movable component; and a linear electric motor or a solenoid for translating the lock member between the locked position and the unlocked position.

The present disclosure thus provides a lock system for an aircraft thrust reverser that is configured to act on a movable component (e.g. a translating cowl) of the thrust reverser. Such a lock system may be described as a "tertiary" lock system. The thrust reverser may also comprise other lock systems that also prevent deployment of the thrust reverser (when these lock systems are locked). Two "primary" lock(s) are typically coupled to the actuators of the thrust reverser. However, the thrust reverser may comprise any suitable and desired number of lock systems, such that the (e.g. "tertiary") lock system of the present disclosure may be the "primary", "secondary", "quaternary" or other order of lock system, depending on the number of other lock systems in the thrust reverser.

The (e.g. tertiary) lock system includes a lock member that is (linearly) translatable between an extended (projecting) locked position and a retracted unlocked position (and vice versa). In the locked position, the lock member is extended and blocks the path of a movable component of the thrust reverser (e.g. to retain the thrust reverser in a "stowed" position). This prevents deployment of the thrust reverser. In the unlocked position the lock member is retracted so that it is moved out of the path of the movable component. This allows the thrust reverser to be deployed, e.g. by the movable component being moved (e.g. past the lock member) to actuate the thrust reverser into a "deployed" position.

The lock member is translated from the locked position to the unlocked position by a linear electric motor or a solenoid, which acts (e.g. directly) on the lock member.

The movable component may form part of a translating cowl of the aircraft thrust reverser. The movable component may move with and/or be directly connected to the translating cowl.

The lock member is movable (translatable) in a linear manner, e.g. in a direction along an (e.g. longitudinal) axis of the lock member. In some embodiments the linear electric motor or the solenoid comprises a movable member (e.g. the secondary of the linear electric motor or the armature of the solenoid) that is movable in the same (parallel) direction as the lock member. In some embodiments the movable member and the lock member are coaxial. Thus, in some embodiments, the movable member is movable coaxially with the lock member, e.g. along the longitudinal axis of the lock member.

The lock member may be any suitable and desired shape. In some embodiments the lock member is longitudinally extended, e.g. along its longitudinal axis. Thus the maximum dimension of the lock member may be along its longitudinal axis, e.g. such that its length (along the longitudinal) axis is greater than its dimensions (e.g. width) in directions that are perpendicular to the longitudinal axis.

The lock member may comprise a surface configured to abut the movable component upon movement of the movable component from a stowed position (and when the lock member is in its locked position), so as to prevent movement of the component to deploy the thrust reverser. The first surface may lie in a plane substantially perpendicular to the direction of the path along which the movable component is moved.

The movable member (of the linear electric motor or the solenoid) may act on (engages with, e.g. contacts) the lock member, e.g. directly. In some embodiments the lock member comprises the movable member. Thus the movable member may be an integral part of the lock member, e.g. an extension of the portion of the lock member that prevents deployment of the movable component of the thrust reverser.

The lock member may be arranged to block the path of the movable component of the thrust reverser, to prevent deployment of the thrust reverser, in any suitable and desired way. The lock member may be arranged, in the locked position, to project through an aperture in the movable component, to prevent the movable component being moved, e.g. in a direction past the lock member, and thus prevent the thrust reverser being deployed. In some embodiments the lock member is arranged, in the locked position, to project past the end of the movable component, to prevent the movable component being moved (from its stowed position to its deployed position), e.g. in a direction past the lock member, and thus prevent the thrust reverser being deployed.

The lock member may be translatable in any suitable and desired direction. In some embodiments, the lock member is (linearly) translatable in a direction substantially perpendicular to the direction of movement of the movable component of the thrust reverser (i.e. the direction of the path along which the movable component is moved to deploy the thrust reverser). Thus, the movable component may be movable (translatable) in a first direction (from its stowed position to its deployed position) for deploying the thrust reverser and a second (reverse) direction (from its deployed position to its stowed position) for stowing the thrust reverser. In some embodiments, the lock member is (linearly) translatable in a direction substantially perpendicular to the first and second directions of movement of the movable component.

The (e.g. tertiary) lock system may be mounted to the aircraft in any suitable and desired way. In some embodiments the lock system is mounted on a stationary (non-moving) part of the nacelle structure, for example secured or mounted to a beam along which the movable component (e.g. translating cowl) moves.

In some embodiments the lock system comprises a casing (e.g. mounted on a fixed structure, such as the stationary part of the nacelle structure), wherein the lock member is movably mounted in, on, or relative to, the casing. Thus, in some embodiments, the lock member is arranged to be translated (into the locked position), e.g. within the casing, such that it protrudes from the casing (and, e.g., the fixed structure). Similarly, in some embodiments, the lock member is arranged to be translated (into the unlocked position) such that it is (at least partially) retracted into the casing (and, e.g., relative to the fixed structure).

In some embodiments the linear electric motor or the solenoid is mounted on the casing. Thus, in some embodiments the movable member is movably mounted on (or relative to) the casing.

In some embodiments the lock system comprises one or two hard stops (e.g. the casing and/or the lock member comprise one or two end stops) arranged to define one or both of the end points of travel of the lock member (i.e. to set the locked and/or unlocked positions of the lock member). Thus the hard stops(s) may prevent the lock member from being translated beyond the locked and/or locked positions.

In some embodiments the lock system comprises a linear electric motor arranged to translate the lock member between the locked position and the unlocked position. In some embodiments the lock member comprises a movable member (e.g. the secondary) of the linear electric motor, e.g. the movable member is an integral part of or attached to the lock member. In some embodiments the lock system comprises a movable member of the linear electric motor, wherein the movable member is arranged to act on the lock member.

The linear electric motor may comprise any suitable and desired type of linear electric motor. In some embodiments the linear electric motor comprises an induction motor, a switched reluctance motor or a permanent magnet motor.

The movable member (e.g. of the lock member) may comprise a conducting member of the linear electric motor. The induction motor may comprise a double sided flat induction motor. The induction motor may comprise a movable member comprising a conductive plate. The induction motor may be energised by an AC supply, e.g. as a "bang-bang" system. The induction motor may comprise any suitable and desired number of poles, slots and phases. For example, the induction motor may comprise two poles and nine slots (for the coil windings of the primary of the induction motor, e.g. using a coil span of 3 slots).

The permanent magnet motor may comprise a flat or tubular permanent magnet motor. The movable member (e.g. of the lock member) may comprise the permanent magnets of the permanent magnet motor. For example, a tubular permanent magnet motor may comprise four poles and six slots (for the concentrated coil windings of the primary of the permanent magnet motor).

The linear electric motor or the solenoid is arranged to translate the lock member between the locked position and the unlocked position. In one embodiment the linear electric motor is (also) arranged to translate the lock member from the unlocked position to the locked position. Thus the linear electric motor may be arranged to translate the lock member in both directions, between the locked position and the unlocked position, and vice versa.

In some embodiments the lock system comprises a retaining mechanism arranged to retain the lock member in the locked position and/or the unlocked position. The retaining mechanism may be arranged to act on the lock member or the movable member, to retain the member in the locked position and/or the unlocked position.

The retaining mechanism may be any suitable and desired mechanism for retaining the lock member in the locked and/or locked positions. In some embodiments the retaining mechanism comprises one or more ball detents. The force exerted by the ball detent(s) (e.g. on the movable member or the lock member) may be overcome, e.g. by the linear electric motor, to move the lock member away from its retained position (e.g. from the locked position to the unlocked position or vice versa).

The one or more ball detents may be arranged in the movable member or the lock member and may engage with one or more depressions (e.g. grooves) in the casing of the lock system to retain the lock member in the locked position and/or the unlocked position. In some embodiments the casing comprises a core and the movable member or the lock member is hollow and is movably mounted on the core. In some embodiments the one or more ball detents are mounted in the core of the casing and are arranged to engage with one or more depressions (e.g. grooves) in the movable member or the lock member (e.g. defined on an inner surface of the movable member or the lock member), to retain the lock member in the locked position and/or the unlocked position. Embodiments are also envisaged in which the ball detent(s) are mounted in the casing and act on an outer surface of the movable member or the lock member.

In some embodiments the retaining mechanism comprises one or more friction plates. The one or more friction plates may be arranged to engage with the (surface of the) movable member or the lock member. The one or more friction plates may be mounted on the casing of the lock system.

The friction plate(s) may be biased (e.g. spring loaded) or actuated (e.g. by a solenoid) towards the movable member or the lock member. In the embodiments in which the friction plate(s) are biased, the force exerted by the friction plate(s) (e.g. on the movable member or the lock member) may be overcome, e.g. by the linear electric motor, to translate the lock member away from its retained position (e.g. from the locked position to the unlocked position or vice versa). In the embodiments in which the friction plate(s) are actuated, the friction plate(s) may be arranged to be retracted, when the lock member is to be translated away from its retained position (e.g. from the locked position to the unlocked position or vice versa).

In some embodiments the retaining mechanism comprises one or more solenoid plungers. The one or more solenoid plungers may be arranged to engage with one or more depressions (e.g. grooves) in the movable member or the lock member (e.g. defined on an outer surface of the movable member or the lock member), to retain the lock member in the locked position and/or the unlocked position. The one or more solenoid plungers may be mounted on the casing of the lock system. The solenoid plunger(s) may be arranged to be retracted, when the lock member is to be translated away from its retained position (e.g. from the locked position to the unlocked position or vice versa).

These retaining mechanisms (e.g. ball detent(s), friction plate(s) and solenoid plunger(s)) may be particularly suitable for use with a linear electric motor.

The retaining mechanism may be arranged to retain the lock member in the locked (and/or unlocked) position when the lock member is exposed to vibrations that generate a force on the lock member.

The linear electric motor may be controlled, e.g. by the aircraft, in any suitable and desired way. In some embodiments the lock system comprises an (e.g. intermediate) controller arranged to control the linear electric motor, e.g. upon receiving a (lock or unlock) command from the aircraft control. The (e.g. intermediate) controller may be arranged to control the phases of the linear electric motor, for energising the linear electric motor.

In some embodiments the lock system comprises a solenoid arranged to translate the lock member between the locked position and the unlocked position. Thus, the solenoid may be energised to translate the lock member from the locked position to the unlocked position. In some embodiments the solenoid may be de-energised to translate the lock member from the unlocked position to the locked position.

In some embodiments the lock member comprises a movable member (plunger or armature) of the solenoid, e.g. the movable member is an integral part of or attached to the lock member. In some embodiments the lock system comprises a movable member (plunger or armature) of the solenoid, wherein the movable member is arranged to act on the lock member.

In some embodiments the lock system comprises a biasing mechanism for biasing the lock member towards the locked position to retain the lock member in the locked position, e.g. the retaining mechanism discussed above may comprise a biasing mechanism. In some embodiments the biasing mechanism is arranged to (e.g. act on the lock member or the movable member to) translate the lock member from the unlocked position to the locked position, e.g. when the solenoid is de-energised.

The biasing mechanism may comprise any suitable and desired mechanism that biases the lock member towards the locked position. In some embodiments the biasing mechanism comprises one or more compression springs, e.g. arranged outside or within the solenoid. The one or more compression springs may be arranged to act on a (e.g. projecting) flange (e.g. a hard stop) of the lock member.

Such biasing mechanisms may be particularly suitable for use in the embodiments in which a solenoid is used to translate the lock member.

The biasing mechanism may be arranged to retain the lock member in the locked position when the lock member is exposed to vibrations that generate a force on the lock member.

The solenoid may be arranged to receive current (for energising the solenoid) (e.g. directly) from the aircraft control. For example, an "unlock" command may be input into the aircraft control and the aircraft control may supply a (e.g. high) current to the solenoid, for translating the lock member into the unlocked position (e.g. against the bias of the biasing mechanism). The current supplied to the solenoid may be reduced, once the lock member is in the unlocked position, to retain the solenoid in the unlocked position (e.g. against the bias of the biasing mechanism). The current supplied to the solenoid may be removed (i.e. to de-energise the solenoid), when the lock member is in the unlocked position, to translate the lock member from the unlocked position to the locked position (e.g. using the bias of the biasing mechanism to translate the lock member into the locked position).

In some embodiments the lock system comprises a position sensor arranged to determine the position of the lock member. The position sensor may be arranged to be connected to the aircraft control and/or to the (e.g. intermediate) controller. The position sensor may be arranged to provide an indication of the position of the lock member to the aircraft control and/or to the (e.g. intermediate) controller. The aircraft control and/or the (e.g. intermediate) controller may be arranged to control operation of the linear electric motor or the solenoid using the indication of the position of the lock member.

In some embodiments the lock system comprises a manual override arranged to allow the lock member to be moved between the locked position and the unlocked position, and/or vice versa.

The disclosure also extends to a thrust reverser assembly comprising the lock system as described herein. The thrust reverser assembly may comprise the movable component, which may form part of a translating cowl of the thrust reverser assembly.

The thrust reverser assembly may further comprise one or more actuators arranged to move the movable component (and, e.g., the translating cowl) between a stowed position and a deployed position (and vice versa). The lock system may be configured to selectively prevent movement of the movable component (and, e.g., the translating cowl) from the stowed position to the deployed position by selective movement of the lock member between the unlocked position and the locked position. The lock system may be configured to selectively allow movement of the movable component (and, e.g., the translating cowl) from the stowed position to the deployed position by selective movement of the lock member between the locked position and the unlocked position.

In the locked position, the lock member may be arranged to prevent movement of the movable component (and, e.g., the translating cowl) from the stowed position to the deployed position, to prevent deployment of the thrust reverser. In the unlocked position, the lock member may be arranged to allow movement of the movable component (and, e.g., the translating cowl) from the stowed position to the deployed position, to allow deployment of the thrust reverser.

The disclosure also extends to a method of preventing deployment of an aircraft thrust reverser, comprising of providing a tertiary lock system or thrust reverser assembly as described herein; and controlling the linear electric motor or the solenoid to move the lock member from the unlocked position to the locked position, such that the lock member blocks the path of the movable component of the thrust reverser assembly and prevents deployment of the thrust reverser.

The method may also comprise controlling the linear electric motor to move the lock member from the locked position to the unlocked position, such that the lock member is moved out of the path of the movable component of the thrust reverser assembly and allows deployment of the thrust reverser; or controlling the solenoid to allow the lock member to be moved (e.g. by the biasing member) from the locked position to the unlocked position, such that the lock member is moved out of the path of the movable component of the thrust reverser assembly and allows deployment of the thrust reverser.

BRIEF DESCRIPTION OF THE DRAWINGS

Various embodiments will now be described, by way of example only, and with reference to the accompanying drawings in which.

DETAILED DESCRIPTION

Thrust reversers are provided on jet engines typically to increase the amount of braking on an aircraft upon landing, by changing the direction of thrust of the jet engine, when the thrust reverser is deployed, such that some or all of the thrust is directed forwards. Embodiments of a thrust reverser assembly, including a (e.g. tertiary) lock system for retaining the thrust reverser in a stowed position against unwanted deployment, will now be described.

Figure 1:
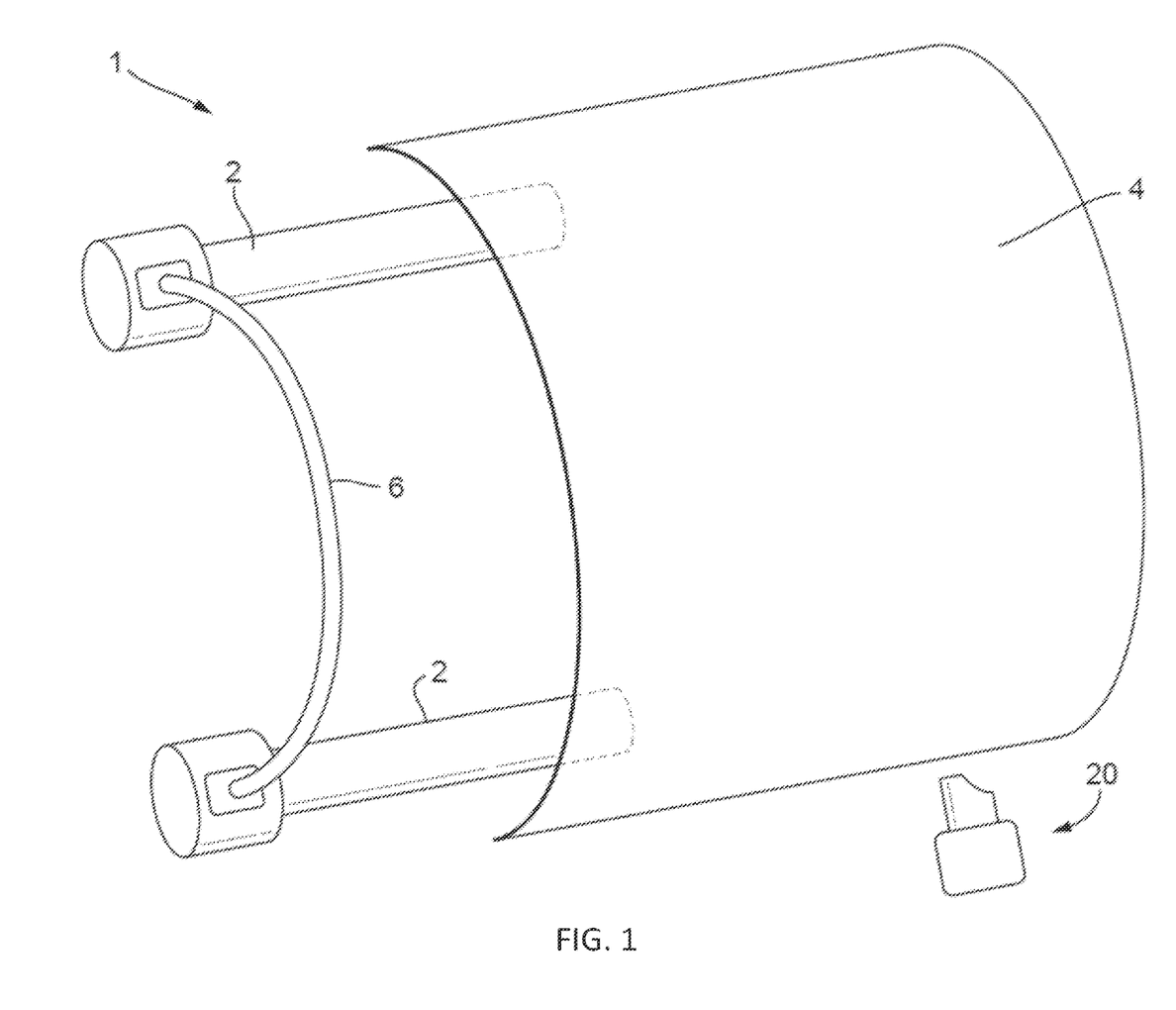
FIG. 1 shows a thrust reverser assembly.

FIG. 1 shows a thrust reverser assembly 1 of an engine (e.g. a jet engine) that comprises a thrust reverser actuation system ("TRAS") in the form of a plurality of actuators 2 that are configured to extend and retract a translating cowl 4. Although a single nacelle cowl is shown, typically two are provided per engine and any number may be provided to suit a particular application. Similarly, the number of actuators may vary and the arrangement shown in FIG. 1 should be treated as representative of an example only.

One or more primary locks (not shown) may be included in the thrust reverser actuation system and are typically located within the housing of the actuators 2. The primary locks may be configured to engage the components of the actuator 2 with which they are configured.

The thrust reverser assembly 1 may further comprise part of the nacelle structure of the engine, in this case the translating cowl 4. The thrust reverser assembly 1 may form part of a cascade-type thrust reverser, for example used on a high bypass ratio jet engine. In such an arrangement, the translating cowl 4 may be located on the external surface of the nacelle of the engine. When deployed (i.e. translated from a stowed position to a deployed position), the translating cowl 4 exposes a plurality of cascade vanes, which redirect airflow through the jet engine such that the direction of jet thrust is at least partially reversed.

One of the actuators 2 may be configured to receive the rotational drive force and, in response thereto, selectively move the translating cowl 4 between its stowed position and deployed position. The actuators 2 may be operatively connected by a synchronisation mechanism 6, such that the actuators 2 may be driven at substantially the same time. In another embodiment, actuators 2 could be hydraulically operated.

The lock systems of the present disclosure are directed to tertiary lock systems, which are configured to engage the moving parts of the nacelle structure of the engine. This is distinct from the primary lock systems, which typically engage the components of the actuators.

A tertiary lock system 20 is shown schematically in FIG. 1 as engaging the translating cowl 4. It should be noted that the tertiary lock system 20 does not engage any component of the actuators 2. The tertiary lock system 20 may be fixed to the non-moving part of the nacelle structure, for example secured or mounted to a beam along which the translating cowl 4 moves (e.g. a fixed structure 41 as shown in FIGS. 2A and 2B).

Figure 2A:
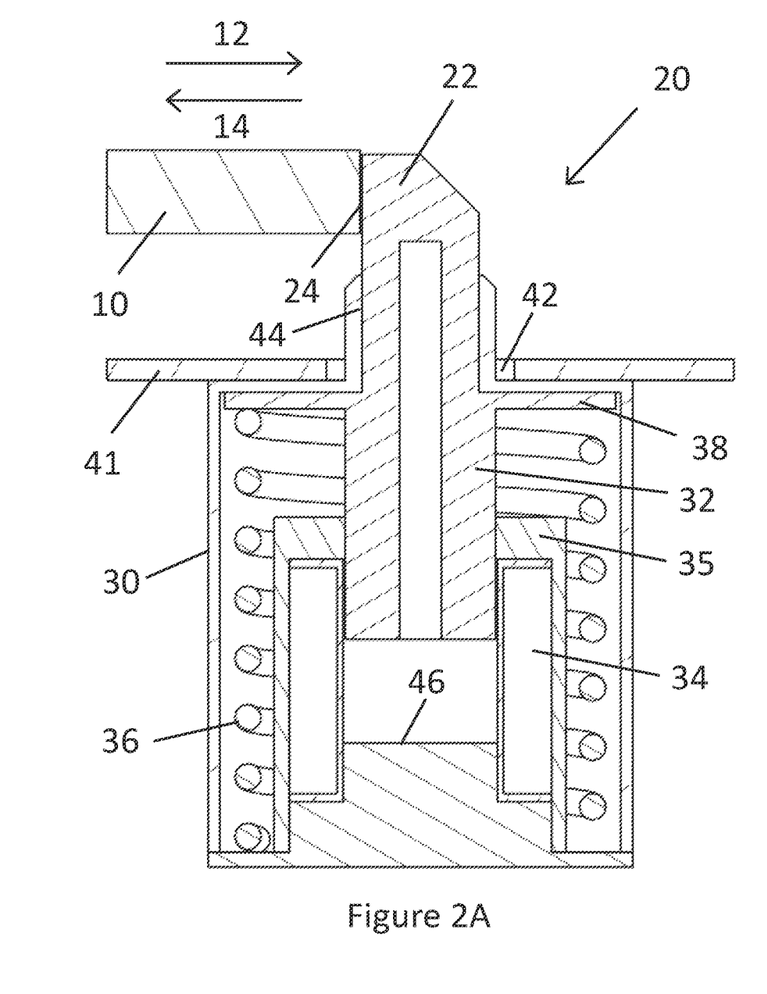
FIGS. 2A and 2B show an embodiment of a tertiary lock system in accordance with the present disclosure.
Figure 2B:
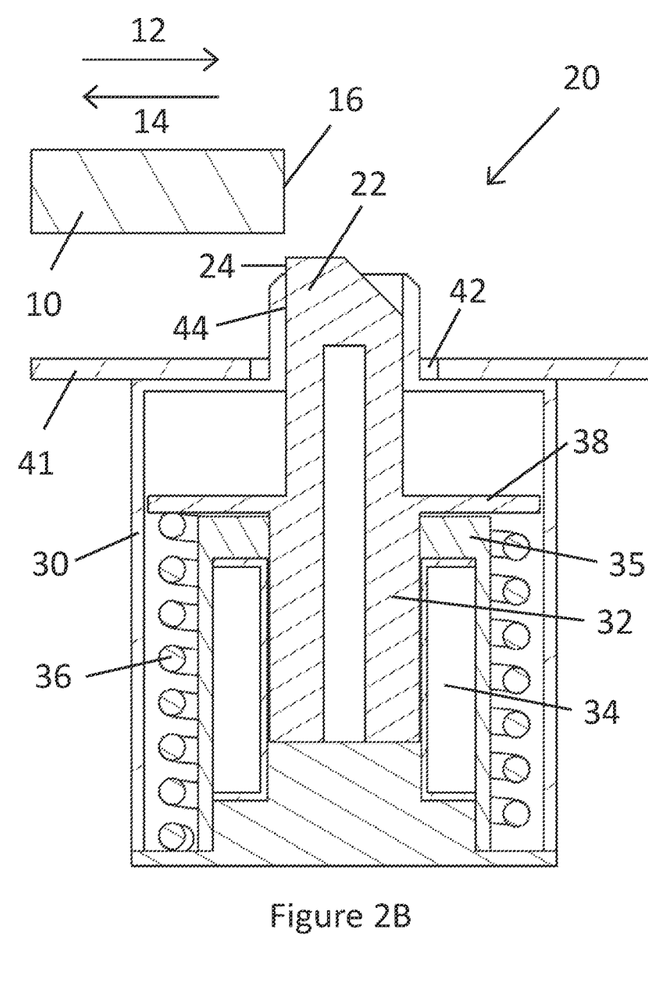

FIGS. 2A and 2B show cross-sectional views of an embodiment of a tertiary lock system 20 in accordance with the disclosure, in which a thrust reverser component 10, which may be a translatable component, is configured to deploy a thrust reversing system. For example, the component 10 may expose, e.g., cascade vanes, causing some of the air flowing through the engine to be redirected in a forward direction to create a reverse thrust, which slows the aircraft to which the engine is attached upon landing. The component 10 may be operatively connected to the translating cowl 4 of the thrust reverser assembly 1 shown in FIG. 1.

The component 10 may be translatable in a first direction, as depicted by arrow 12, in order to deploy the thrust reverser. The component 10 may be translatable in a second opposite direction, as depicted by arrow 14, in order to stow the thrust reverser. A number of locking systems may be provided in order to prevent unwanted deployment of the thrust reverser. One such locking system 20 is shown in FIGS. 2A and 2B, and is configured to prevent movement of the component 10 in the first direction 12.

The lock system 20 comprises a lock member 22 that is translatable between a locked position, as shown in FIG. 2A, and an unlocked position, as shown in FIG. 2B. The lock member 22 may translate in a direction perpendicular to the first and/or second directions.

The lock member 22 comprises a surface 24 configured to abut the component 10 to prevent its movement in the first direction 12 (i.e. to prevent deployment of the thrust reverser). The surface 24 may be configured to abut a corresponding surface 16 on the component 10, and may be substantially perpendicular to the direction of travel (i.e. arrows 12 and 14) of the component 10.

A plurality of lock systems may be provided, each having the same configuration as the lock member 22 of lock system 20, such that a plurality of lock members engages the component 10 at different locations.

The lock member 22 may be movable within a passage 42 of a fixed structure 41 (e.g. a beam within the engine case), within a casing 30. The casing 30 comprises a surface 44 configured to provide a bearing interface to allow the lock member 22 to move freely within the casing 30.

The lock system 20 is shown schematically and comprises the casing 30 in which the lock member 22 is mounted for reciprocal movement through the passage 42 of the fixed structure 41. The casing 30 is attached to the fixed structure 41, e.g. by screws, bolts and/or rivets.

The lock member 22 comprises the core 32 of a solenoid that moves within the coil winding 34 of the solenoid, within the solenoid body 35. The coil winding 34 of the solenoid may be electrically connected to the control of the aircraft of which the tertiary lock system 20 is a part. For example, the coil winding 34 may receive current (for actuation of the solenoid core 32) directly from the aircraft control.

A compression spring 36 is arranged within the casing 30 to surround the solenoid and the lock member 22. The spring 36 extends and acts between one end of the casing 30 and an annular flange 38 that extends perpendicularly from the lock member 22. (Embodiments are also envisaged in which one or more springs 36 are used, and/or installed within the solenoid, e.g. inside the solenoid core.)

An end stop 46 is defined within the casing 30 to define the end point of travel of the lock member 22 in its unlocked position (FIG. 2B), i.e. this end point is reached when the core 32 of the solenoid contacts the end stop 46. (Embodiments are also envisaged in which the end stop is located elsewhere, for example between the annular flange 38 and the solenoid body 35). The end point of travel of the lock member 22 in its locked position (FIG. 2A) is reached when the annular flange 38 contacts the end of the casing 30 adjacent the fixed structure 41.

Operation of the tertiary lock system 20 will now be described, with reference to FIGS. 1, 2A and 2B. During normal aircraft operation, for example, during take-off or at a cruise altitude, the thrust reverser must be stowed and locked, so that unwanted deployment is prevented. The thrust reverser assembly 1, which comprises a thrust reverser actuation system ("TRAS"), is configured to deploy and stow the thrust reverser. This may be done by actuators 2 that are configured to extend and retract a translating cowl 4, as shown in FIG. 1.

The thrust reverser may be locked by multiple different locks, e.g. primary locks coupled to the actuators 2, and tertiary locks coupled directly to the translating cowl 4. Operation of the tertiary lock system 20 will be described in more detail with reference to FIGS. 2A and 2B.

During normal aircraft operation, the lock member 22 of the tertiary lock system 20 is in the "locked" position shown in FIG. 2A, such that the thrust reverser component 10 is prevented from moving into a deployed position. The lock member 22 assumes this position by virtue of the solenoid winding 34 not being energised, such that the spring 36 pushes the lock member 22 into the locked position.

When the aircraft lands, and the thrust reverser is desired to be deployed in order to increase the amount of braking on the aircraft, the aircraft control is used to unlock the tertiary lock system 20. Current from the aircraft control energises the coil winding 34 of the solenoid to actuate the core 32 of the solenoid and thus the lock member 22. This moves the lock member 22 into the "unlocked" position, as shown in FIG. 2B, against the bias of the spring 36.

With the lock member 22 in the unlocked position, the actuators 2 can be actuated (synchronised by the synchronization mechanism 6) to move the thrust reverser component 10 past the lock member 22 (in the first direction 12) to deploy the thrust reverser. During deployment, the solenoid remains energised to hold the lock member 22 in the unlocked position.

Once operation of the thrust reverser is no longer required, the thrust reverser component 10 is moved back in the second, opposite direction 14, clear of the lock member 22, to stow the thrust reverser. The current to the solenoid winding 34 may then be removed, such that the spring 36 acts on the lock member 22 to move it back into the locked position. In other embodiments, the current may be removed while the thrust reverser is in the fully deployed position, and then the solenoid may be re-energised to retract the lock member 22 when the thrust reverser needs to be stowed.

Figure 3A:
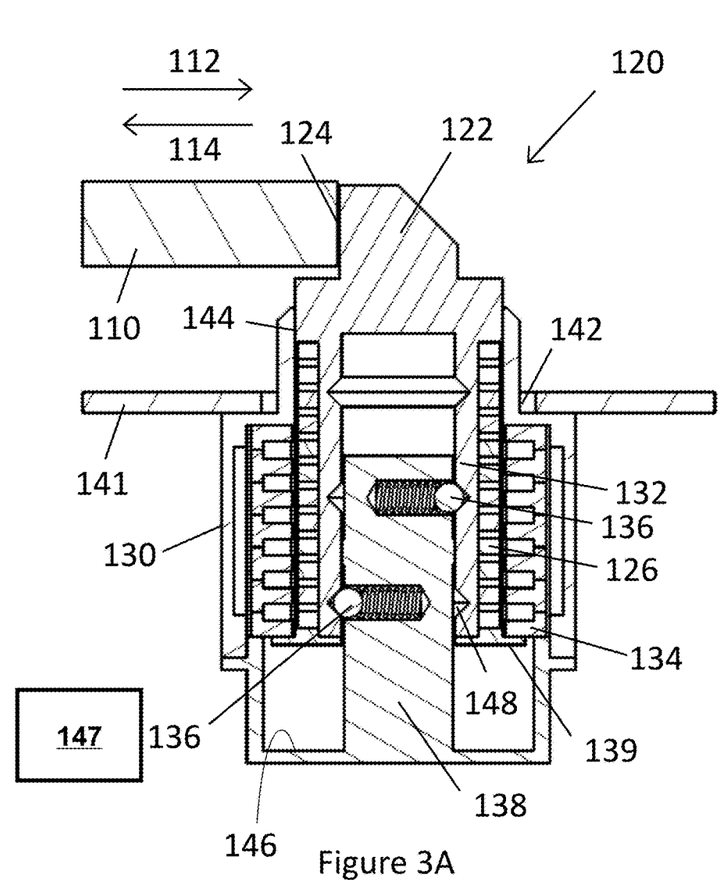
FIGS. 3A and 3B show another embodiment of a tertiary lock system in accordance with the present disclosure.
Figure 3B:
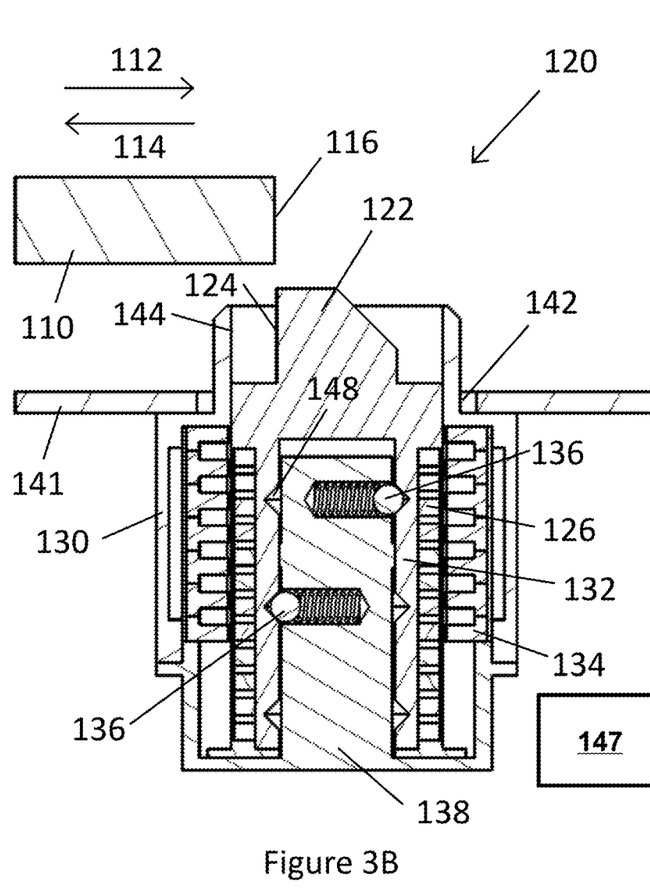

FIGS. 3A and 3B show cross-sectional views of another embodiment of a tertiary lock system 120 in accordance with the disclosure, in which a thrust reverser component 110, which may be a translatable component, is configured to deploy a thrust reversing system. The component 110 may be operatively connected to the translating cowl 4 of the thrust reverser assembly 1 shown in FIG. 1.

In a similar manner to the system shown in FIGS. 2A and 2B, the component 110 may be translatable in a first direction, as depicted by arrow 112, in order to deploy the thrust reverser. The component 110 may be translatable in a second opposite direction, as depicted by arrow 114, in order to stow the thrust reverser. The locking system 120 is configured to prevent movement of the component 110 in the first direction 112.

The lock system 120 comprises a lock member 122 that is translatable between a locked position, as shown in FIG. 3A, and an unlocked position, as shown in FIG. 3B. The lock member 122 may translate in a direction perpendicular to the first and/or second directions.

The lock member 122 comprises a surface 124 configured to abut the component 110 to prevent its movement in the first direction 112 (i.e. to prevent deployment of the thrust reverser). The surface 124 may be configured to abut a corresponding surface 116 on the component 110, and may be substantially perpendicular to the direction of travel (i.e. arrows 112 and 114) of the component 110.

A plurality of lock systems may be provided, each having the same configuration as the lock member 122 of lock system 120, such that a plurality of lock members engages the component 110 at different locations.

The lock member 122 may be movable within a passage 142 of a fixed structure 141 (e.g. a beam within the engine case), within a casing 130. The casing 130 comprises a surface 144 configured to provide a bearing interface to allow the lock member 122 to move freely within the casing 130.

The lock system 120 is shown schematically and comprises the casing 130 in which the lock member 122 is mounted for reciprocal movement through the passage 142 of the fixed structure 141. The casing 130 is attached to the fixed structure 141, e.g. by screws, bolts and/or rivets.

The lock member 122 has mounted thereon a plurality of permanent magnets 126 to form the secondary member 132 of a (e.g. tubular) linear electric motor that moves within the primary windings 134 of the linear electric motor. The primary windings 134 of the linear electric motor may be electrically connected to the control of the aircraft of which the tertiary lock system 120 is a part, via an intermediate controller. For example, the phases of the linear electric motor may be controlled by the intermediate controller once an unlock or lock command has been received from the aircraft control.

The lock member 122 has a hollow centre. The casing 130 has a central core 138 on which the lock member 122 is mounted and moves reciprocally. Ball detents 136 are positioned within radially extending bores in the central core 138. The ball detents 136 are arranged to engage with corresponding circumferential grooves 148 in the hollow centre of the lock member 122. The ball detents 136 engage with the circumferential grooves 148 to hold the lock member 122 in the locked and unlocked positions shown in FIGS. 3A and 3B respectively. (Embodiments are also envisaged in which the ball detents 136 are provided to engage with the outer surface of lock member.) A position sensor 147 is arranged to determine the position of the lock member, and arranged to provide an indication of the position of the lock member to the aircraft control (not shown).

An end stop 146 is defined within the casing 130 to define the end point of travel of the lock member 122 in its unlocked position (FIG. 2B), i.e. this end point is reached when the base of the lock member 122 contacts the end stop 146. The end point of travel of the lock member 122 in its locked position (FIG. 2A) is reached when an annular flange 139 at the base of the lock member 122 contacts the base of the primary windings 134.

Operation of the tertiary lock system 120 shown in FIGS. 3A and 3B is similar to the operation, described above, of the tertiary lock system shown in FIGS. 2A and 2B. The main difference is that the linear electric motor is used to actuate the lock member 122 in both directions of its travel (compared to the spring and the solenoid of the tertiary lock system shown in FIGS. 2A and 2B). Furthermore, the lock member 122 is held in both the locked and unlocked positions by the ball detents 136 engaging with the respective grooves 148.

During normal aircraft operation, the lock member 122 of the tertiary lock system 120 is in the "locked" position shown in FIG. 3A, such that the thrust reverser component 110 is prevented from moving into a deployed position. The lock member 122 is retained in the locked position by the ball detents 136 engaging with the lower two grooves 148. The windings 134 of the linear electric motor are not energised while the lock member 122 is retained in the locked position.

When the aircraft lands, and the thrust reverser is desired to be deployed in order to increase the amount of braking on the aircraft, the aircraft control issues an "unlock" command to the intermediate controller, which in turn controls the current supplied to the primary windings 134. Current energises the primary windings 134 to actuate the permanent magnets 126 and thus the lock member 122. This moves the lock member 122 into the "unlocked" position, as shown in FIG. 3B, at which point the windings 134 can be de-energised.

With the lock member 122 in the unlocked position (where it is retained by the ball detents 136 engaging with the upper two grooves 148), the actuators 2 can be actuated (synchronised by the synchronization mechanism 6) to move the thrust reverser component 110 past the lock member 122 (in the direction 112) to deploy the thrust reverser. During this time, the lock member 122 is retained in the unlocked position by the ball detents 136 engaging with the upper two grooves 148.

Once operation of the thrust reverser is no longer required, the thrust reverser component 110 is moved back in the opposite direction 114, clear of the lock member 122, to stow the thrust reverser. The primary windings 134 of the linear electric motor are then energised, such that the lock member 122 is moved back into the locked position.

The technology of the present disclosure allows a linear electrical actuator to be used to translate a blade style lock member in a (e.g. tertiary) lock system for a thrust reverser. This helps to provide, in at least some embodiments, a lightweight, compact and robust (e.g. tertiary) lock system for a thrust reverser, e.g. compared to a hydraulically actuated lock system or a hook type system.

The present disclosure extends to a thrust reverser assembly, for example the thrust reverser assembly 1 described above, which may be provided on a jet engine (e.g. a turbofan engine), for example to increase the amount of braking of an aircraft upon landing. The thrust reverser assembly may comprise a movable component and a thrust reverser actuation system ("TRAS") comprising one or more actuators (e.g. the actuators 2 shown in FIG. 1). The movable component may form part of a translating cowl of the thrust reverser, if the thrust reverser is, for example, a "cascade-type" thrust reverser.

The actuators may be configured to selectively move the movable component between a stowed position and a deployed position. When the movable component is in its deployed position, the thrust reverser actuation system will change the direction of thrust of the jet engine such that some or all of the thrust is directed forwards, which acts to slow the aircraft so that it can then, for example, taxi off the runway. When the component is in its stowed position, the thrust reverser actuation system will not change the direction of thrust of the jet engine, which operates normally.

The thrust reverser actuation system may be a cascade-type thrust reverser system, comprising one or more translating cowls and a plurality of cascade vanes. In such a system, the one or more translating cowls are each configured to move between a stowed position, in which the plurality of cascade vanes are not exposed to the jet thrust of the engine, and a deployed position, in which the plurality of cascade vanes are exposed to the jet thrust of the engine such that this is redirected in a generally or partially forward direction.

The thrust reverser actuation system may comprise one or more (e.g. tertiary) lock systems coupled to the movable component to prevent unwanted movement of the component (and, e.g., a translating cowl to which it may be attached) to its deployed position. The movable component may be a component 10 as described above in respect of FIG. 2A, and the one or more (e.g. tertiary) lock systems may each have the features of the lock system 20.

The thrust reverser assembly may further include primary lock systems, for example that are coupled to the actuator. It will be appreciated that the tertiary lock system is distinct from the primary lock system, in that the tertiary lock system is configured to engage the moving component of the thrust reverser (e.g. a translating cowl that moves to expose a plurality of cascade vanes), rather than the actuator that moves the component.

Although the present invention has been described with reference to preferred embodiments, it will be understood by those skilled in the art that various changes in form and detail may be made without departing from the scope of the invention as set forth in the accompanying claims. For example, the lock member may be arranged, in the locked position, to project through an aperture in the movable component, rather than simply projecting past the end of the movable component.

The invention claimed is:
1. A nacelle assembly, comprising:
a translatable nacelle cowl;
a fixed structure along which the translatable nacelle cowl moves;
a thrust reverser assembly, comprising:
a thrust reverser that includes the translatable nacelle cowl and a thrust reverser component operatively coupled to the translatable cowl and configured to translate in a first direction to deploy the thrust reverser and to translate in a second direction to stow the thrust reverser, wherein the first and second directions are parallel to each other, and wherein the thrust reverser component has a component end surface that faces the first direction;

a lock system for the thrust reverser, comprising:

a casing, coupled to the fixed structure of the nacelle, wherein the casing has a casing inner wall that extends from a casing bottom end that is below the fixed structure to a casing top end that is above the fixed structure;

a lock member extending in a third direction that is perpendicular to the first direction, between a lock member top end and a lock member bottom end, wherein the lock member top end defines a top portion end surface that faces the second direction, and wherein the lock member is translatable in the third direction within the casing inner wall between:

a locked position, in which the lock member top end is extended above the casing top end, and the lock member bottom end is spaced from the casing bottom end, for preventing deployment of the thrust reverser by the lock member by the top portion end surface of the lock member engaging the component end surface, thereby blocking the path of the component of the thrust reverser, and an unlocked position, in which the lock member top end is at least partially retracted below the casing top end, and the lock member bottom end is against the casing bottom end, for permitting deployment of the thrust reverser by the lock member moving out of the path of the component, wherein:

the casing bottom end has a central core that extends in the third direction toward the casing top end; and the lock member defines a hollow center shaft, with a shaft inner wall and a shaft outer wall, and a bottom aperture that opens toward the casing bottom end, and wherein the hollow center is shaped to receive the central core for mounting the lock member to the lock system;

the shaft inner wall of the center shaft defines grooves; and the central core defines bores and ball detents within the bores and that are biased to fit within the grooves to hold the lock member in the locked and unlocked positions; and an electrically operated actuator for translating the lock member between the locked position and the unlocked position; and a position sensor arranged to determine the position of the lock member that is moved by the electrically operated actuator.

2. The nacelle assembly as claimed in claim 1, wherein the lock member comprises a movable member of the electrically operated actuator.

3. The nacelle assembly as claimed in claim 1, wherein the electrically operated actuator comprises:
an induction motor;
a switched reluctance motor; or
a permanent magnet motor.

4. The nacelle assembly as claimed in claim 3, wherein
the lock member comprises a conducting member of the induction motor; or
wherein one or more permanent magnets of the permanent magnet motor are mounted on the lock member.

5. The nacelle assembly as claimed in claim 1, wherein the electrically operated actuator is arranged to translate the lock member between the unlocked position and the locked position.

6. The nacelle assembly as claimed in claim 1, further comprising:
a retaining mechanism for acting on the lock member to retain the lock member in the locked position and/or the unlocked position.

7. The nacelle assembly as claimed in claim 1, further comprising:
one or more actuators arranged to move the thrust reverser component between a stowed position and a deployed position;
wherein the lock system is arranged to selectively prevent movement of the thrust reverser component from the stowed position to the deployed position by selective movement of the lock member between the unlocked position and the locked position.

8. The thrust reverser assembly as claimed in claim 7, wherein
in the locked position the lock member prevents movement of the thrust reverser component from the stowed position to the deployed position, and
in the unlocked position the lock member allows movement of the thrust reverser component from the stowed position to the deployed position.

9. A method of preventing deployment of an aircraft thrust reverser, comprising:
providing the nacelle assembly as claimed in claim 1;
controlling the electrically operated actuator to move the lock member from the unlocked position to the locked position, such that the lock member blocks the path of the thrust reverser component of the thrust reverser assembly and prevents deployment of the thrust reverser.

10. The nacelle assembly as claimed in claim 1, wherein the electrically operated actuator comprises a linear electric motor.

11. The nacelle assembly of claim 1, wherein:
the casing inner wall includes primary windings; and
the shaft outer wall includes permanent magnets,
wherein in operation energizing the primary windings actuates the permanent magnets, moving the lock member between the stowed and deployed positions.

* * * * *